(12) United States Patent
Lohe et al.

(10) Patent No.: US 11,807,382 B1
(45) Date of Patent: Nov. 7, 2023

(54) INTEGRATED THERMAL MANAGEMENT APPARATUS

(71) Applicant: BETA AIR, LLC, South Burlington, VT (US)

(72) Inventors: Braedon Lohe, Essex Junction, VT (US); Sean Donovan, Richmond, VT (US); Sarah Overfield, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/827,162

(22) Filed: May 27, 2022

(51) Int. Cl.
| | | |
|---|---|---|
| *B64D 33/10* | (2006.01) | |
| *B64D 27/24* | (2006.01) | |
| *B64C 1/12* | (2006.01) | |
| *B64C 1/00* | (2006.01) | |
| *B64C 29/00* | (2006.01) | |

(52) U.S. Cl.
CPC ............ *B64D 33/10* (2013.01); *B64C 1/12* (2013.01); *B64C 29/0025* (2013.01); *B64D 27/24* (2013.01); *B64C 2001/0072* (2013.01); *B64C 2001/0081* (2013.01)

(58) Field of Classification Search
CPC ........ B64D 33/10; B64D 27/24; B64D 33/08; B64D 15/02; B64C 1/12; B64C 29/0025; B64C 2001/0072; B64C 2001/0081
See application file for complete search history.

(56) References Cited

U.S. PATENT DOCUMENTS

| | | | |
|---|---|---|---|
| 10,272,986 B2 | 4/2019 | Taylor | |
| 10,443,620 B2 | 10/2019 | Hoefler et al. | |
| 2015/0191238 A1 | 7/2015 | Hucker et al. | |
| 2015/0321743 A1* | 11/2015 | Raeckers | ............... B64C 1/064 244/119 |
| 2017/0225796 A1* | 8/2017 | Sun | ...................... H01L 23/467 |
| 2019/0033932 A1* | 1/2019 | Ku | ....................... B64D 13/006 |
| 2019/0085770 A1* | 3/2019 | Combes | ................... F02C 7/20 |
| 2020/0003160 A1* | 1/2020 | Silkey | .................... B64C 30/00 |
| 2020/0010209 A1 | 1/2020 | Bender | |
| 2020/0052556 A1* | 2/2020 | Luo | ........................ B64D 33/08 |
| 2021/0031937 A1* | 2/2021 | Schimmels | ............. B64C 1/064 |
| 2022/0042747 A1 | 2/2022 | Bishop | |
| 2022/0255159 A1* | 8/2022 | Amante | ................. B64D 27/24 |

\* cited by examiner

*Primary Examiner* — Rodney A Bonnette
(74) *Attorney, Agent, or Firm* — CALDWELL INTELLECTUAL PROPERTY LAW

(57) ABSTRACT

The present invention is directed to an apparatus for managing thermal energy of an electric aircraft energy source. Apparatus may include fins, which extend from a skin of electric aircraft. The energy source may bias or be adjacent to the fins so that heat energy may dissipate from the energy source and through the fins and, thus, the skin. A coolant may also be run through the apparatus, where the coolant may flow through channels that are disposed between the fins.

19 Claims, 7 Drawing Sheets

INTEGRATED THERMAL MANAGEMENT APPARATUS

FIELD OF THE INVENTION

The present invention generally relates to the field of aircraft. In particular, the present invention is directed to an apparatus for thermal management of an energy source of an electric aircraft.

BACKGROUND

During flight, an energy source of an electric aircraft may become overheated. Conventional cooling systems that are intended to lower a temperature of the energy source may be inefficient or negatively affect the aerodynamics of the electric aircraft.

SUMMARY OF THE DISCLOSURE

In an aspect, a system for managing thermal energy of an energy source is provided. The apparatus includes a skin of an airframe of the electric aircraft, wherein the skin includes an interior surface, a plurality of fins, wherein each fin extends from the interior surface, and a plurality of channels, wherein each channel is at least partially defined by one or more of the plurality of fins, wherein the plurality of channels facilitates flow of a coolant therethrough to reduce a thermal energy of the energy source.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
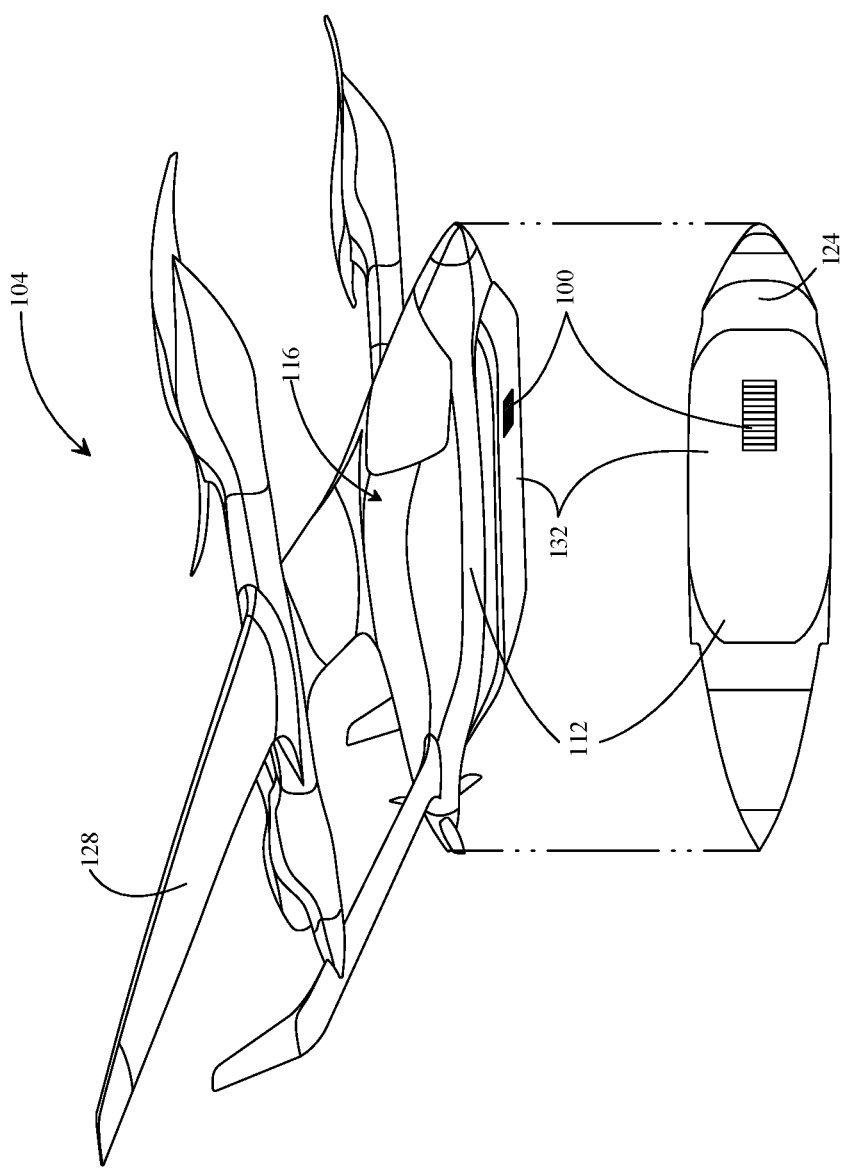
FIG. 1 is a diagrammatic representation illustrating an exemplary embodiment of a thermal management apparatus in accordance with one or more embodiments of the present disclosure.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, an integrated thermal management apparatus for an energy source of an electric aircraft is provided. Integrated thermal management apparatus may include at least a portion of a skin of electric aircraft that transfers heat energy form energy source to a surrounding environment, thus lowering and or maintaining a temperature of energy source using convection. In various embodiments, thermal management apparatus may allow for a coolant to flow from an external environment into a surrounding area of energy source, thus cooling energy source during operation. Integrated thermal management apparatus may allow for temperature regulation of energy source without adding significant additional weight to electric aircraft or affecting aerodynamics of electric aircraft. Skin of electric aircraft may act as a heat exchanger that allows coolant to transfer heat from energy source into skin, thus, reducing a temperature of energy source without the use of heavy equipment, such as a radiator. In one or more embodiments, skin of integrated thermal management apparatus may include one or more moveable and/or fixed fins, or other surface features, that increase convective cooling of energy source. In various embodiments, a portion of skin of electric aircraft may include an underbelly of electric aircraft.

In the following description, for purposes of explanation, numerous details are set forth in order to provide understanding of the present invention. It will be apparent, however, that the present invention may be practiced without these specific details. As used in this disclosure, the word "exemplary" or "illustrative" means "serving as an example, instance, or illustration." Any implementation described in this disclosure as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary, or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed in this disclosure are not to be considered as limiting, unless the claims expressly state otherwise.

For the purposes of this disclosure, "communicatively connected" is a process whereby one device, component, or circuit is able to receive data from and/or transmit data to another device, component, or circuit. Communicative connection may be performed by wired or wireless electronic communication, either directly or by way of one or more intervening devices or components. In an embodiment, communicative connection includes electrically connecting an output of one device, component, or circuit to an input of another device, component, or circuit. Communicative connection may be performed via a bus or other facility for intercommunication between elements of a computing device. Communicative connection may include indirect connections via "wireless" connection, low power wide area network, radio communication, optical communication, magnetic, capacitive, or optical connection, or the like. In an embodiment, communicative connecting may include electrically connecting an output of one device, component, or circuit to an input of another device, component, or circuit. Communicative connecting may be performed via a bus or other facility for intercommunication between elements of a computing device. Communicative connecting may include indirect connections via "wireless" connection, low power wide area network, radio communication, optical communication, magnetic, capacitive, or optical connection, or the like.

Referring now to FIG. 1, an exemplary embodiment of an integrated thermal management apparatus 100 of an electric aircraft 104 for thermal management of energy source 108 of the electric aircraft 104 is shown. As used in this disclosure an "energy source" is a source that powers, drives, and/or controls any flight component and/or other aircraft component. Energy source 108 may include a battery pack. A battery pack may include a power source that may be configured to store electrical energy in the form of a plurality of battery modules, which themselves include of a plurality of electrochemical cells. These cells may utilize electrochemical cells, galvanic cells, electrolytic cells, fuel cells, flow cells, and/or voltaic cells. In general, an electrochemical cell is a device capable of generating electrical energy from chemical reactions or using electrical energy to cause chemical reactions, this disclosure will focus on the former. Voltaic or galvanic cells are electrochemical cells that generate electric current from chemical reactions, while electrolytic cells generate chemical reactions via electrolysis. In general, the term "battery" may be used to described a collection of cells connected in series or parallel to each other. A battery cell may, when used in conjunction with other cells, may be electrically connected in series, in parallel or a combination of series and parallel. Series connection includes wiring a first terminal of a first cell to a second terminal of a second cell and further configured to include a single conductive path for electricity to flow while maintaining the same current (measured in Amperes) through any component in the circuit. A battery cell may use the term "wired," but one of ordinary skill in the art would appreciate that this term is synonymous with "electrically connected," and that there are many ways to couple electrical elements like battery cells together. An example of a connector that does not include wires may be prefabricated terminals of a first gender that mate with a second terminal with a second gender. Battery cells may be wired in parallel. Parallel connection includes wiring a first and second terminal of a first battery cell to a first and second terminal of a second battery cell and further configured to include more than one conductive path for electricity to flow while maintaining the same voltage (measured in Volts) across any component in the circuit. Battery cells may be wired in a series-parallel circuit which combines characteristics of the constituent circuit types to this combination circuit. Battery cells may be electrically connected in a virtually unlimited arrangement which may confer onto the system the electrical advantages associated with that arrangement such as high-voltage applications, high-current applications, or the like. In an exemplary embodiment, battery pack 500 may include 196 battery cells in series and 18 battery cells in parallel. This is, as someone of ordinary skill in the art would appreciate, is only an example and battery pack 500 may be configured to have a near limitless arrangement of battery cell configurations.

With continued reference to FIG. 1, battery pack may include a plurality of battery modules. The battery modules may be wired together in series and/or in parallel. Battery pack may include a center sheet which may include a thin barrier. The barrier may include a fuse connecting battery modules on either side of the center sheet. The fuse may be disposed in or on the center sheet and configured to connect to an electric circuit having a first battery module and therefore battery unit and cells. In general, and for the purposes of this disclosure, a fuse is an electrical safety device that operate to provide overcurrent protection of an electrical circuit. As a sacrificial device, its essential component is metal wire or strip that melts when too much current flows through it, thereby interrupting energy flow. The fuse may include a thermal fuse, mechanical fuse, blade fuse, expulsion fuse, spark gap surge arrestor, varistor, or a combination thereof. Battery pack may also include a side wall includes a laminate of a plurality of layers configured to thermally insulate the plurality of battery modules from external components of battery pack. The side wall layers may include materials which possess characteristics suitable for thermal insulation as described in the entirety of this disclosure like fiberglass, air, iron fibers, polystyrene foam, and thin plastic films, to name a few. The side wall may additionally or alternatively electrically insulate the plurality of battery modules from external components of battery pack and the layers of which may include polyvinyl chloride (PVC), glass, asbestos, rigid laminate, varnish, resin, paper, Teflon, rubber, and mechanical lamina. The center sheet may be mechanically coupled to the side wall in any manner described in the entirety of this disclosure or otherwise undisclosed methods, alone or in combination. The side wall may include a feature for alignment and coupling to the center sheet. This feature may include a cutout, slots, holes, bosses, ridges, channels, and/or other undisclosed mechanical features, alone or in combination.

Still referring to FIG. 1, energy source 108 may be used to provide a steady supply of electrical power to one or more components of electric aircraft 104 during operation. Energy source 108 may supply electrical power to a motor that operates to move one or more flight components, such as lift components and/or one or more pusher components, of electric aircraft to drive one or more blades, or the like thereof. Motor(s) may be driven by direct current (DC) electric power and may include, without limitation, brushless DC electric motors, switched reluctance motors, induction motors, or any combination thereof. Motor(s) may also include electronic speed controllers or other components for regulating motor speed, rotation direction, and/or dynamic braking. A "motor" as used in this disclosure is any machine that converts non-mechanical energy into mechanical energy. An "electric motor" as used in this disclosure is any machine that converts electrical energy into mechanical energy.

In one or more embodiments, electric aircraft 104 (also referred to herein as an "aircraft") may include an electric vertical takeoff and landing (eVTOL) aircraft. Electric aircraft 104 may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

With continued reference to FIG. 1, electric aircraft 104 may include an airframe 116, which is a mechanical structure of electric aircraft 104. In other embodiments, airframe 116 may include a plurality of airframes. In one or more embodiments, airframe 116 may include a plurality of structural elements, as discussed further below in this disclosure. For the purposes of this disclosure, "structural elements" include elements that physically support a shape and/or structure of an aircraft. Structural elements may take a plurality of forms and vary depending on, for example and without limitation, a construction type of aircraft 104, as discussed below in this disclosure. Airframe 116 may be composed of aluminum, steel, titanium, composites, any combination thereof, and the like. In one or more nonlimiting embodiments, a structural element may be composed of one or more one or more carbon fiber composite structures. A carbon fiber composite structure may be configured to include high stiffness, high tensile strength, low weight-to-strength ratio, high chemical resistance, high temperature tolerance, and low thermal expansion. In one or more embodiments, a carbon fiber composite may include one or more carbon fiber composite materials, including a plastic resin and/or graphite. For example, and without limitation, a carbon fiber composite material may be formed as a function of a binding carbon fiber to a thermoset resin, such as an epoxy, and/or a thermoplastic polymer, such as polyester, vinyl ester, nylon, and the like thereof.

Still referring to FIG. 1, airframe 116 may include a fuselage 112, an undercarriage, an empennage, wings, and the like. In one or more embodiments, airframe 116 may include structural elements that provide support and shape to electric aircraft 104. In one or more embodiments, airframe 116 includes a skin 124. For the purposes of this disclosure, a "skin" of an aircraft is an outer surface that covers an aircraft, such as the wings and fuselage. Aircraft skin 124 may be layered over the structural elements of airframe 116 and provide an aerodynamic surface of electric aircraft, as discussed further below. Skin 124 may include a plurality of materials such as aluminum, fiberglass, and/or carbon fiber. Skin 124 may define integrated thermal management apparatus 100. Integrated thermal management apparatus 100 may be position in skin 124 so that apparatus 100 is adjacent to or abutting energy source 108 of aircraft 104. Apparatus 100 facilitates temperature regulation of energy source 108. For example, and without limitation, apparatus 100 may allow for air from an external environment to aircraft 104 to circulate through apparatus 104 and around energy source 108, such as into a compartment of electric aircraft 104 that energy source 108 is disposed within. In one or more embodiments, apparatus 100 may be positioned on an underbelly 132 of fuselage 112. For example, and without limitation, apparatus 100 may be defined by skin 124 of underbelly 132 of aircraft 104. For the purposes of this disclosure, a "fuselage" is the main body of an aircraft, or in other words, the entirety of the aircraft except for the cockpit, nose, wings, empennage, nacelles, and any control surfaces. In various embodiments, fuselage 112 generally contains an aircraft's payload and/or passengers. In one or more embodiments, energy source 108 may be disposed within fuselage 112. Fuselage 112 may include structural elements that physically support the shape and structure of aircraft 104. As previously mentioned, structural elements may vary depending on the construction type of aircraft 104 and, specifically, fuselage 112. For example, and without limitation, fuselage 112 may include a truss construction, geodesic construction, monocoque construction, a semi-monocoque construction, and the like. A truss structure may be used with a lightweight aircraft and may include welded aluminum tube trusses. A truss, as used in this disclosure, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams.

In one or more embodiments, fuselage 112 may include and/or be constructed using geodesic construction. Geodesic structural elements may include stringers wound about formers (which may be alternatively called station frames) in opposing spiral directions. A "stringer," as used in this disclosure, is a general structural element that may include a long, thin, and rigid strip of metal or wood that is mechanically connected to and spans a distance from station frame to station frame to create an internal skeleton on which to mechanically connect aircraft skin. A former (or station frame) may include a rigid structural element that is disposed along a length of an interior of aircraft fuselage 112 orthogonal to a longitudinal (nose to tail) axis of aircraft 104 and may form a general shape of fuselage 112. A former may include differing cross-sectional shapes at differing locations along fuselage 108, as the former is the structural element that informs the overall shape of a fuselage 112 curvature. In embodiments, skin 124 may be anchored to formers and strings such that an outer mold line (OML) of a volume encapsulated by formers and stringers comprises the same shape as aircraft 104 when installed. In other words, former (s) may form a fuselage's ribs, and stringers may form the interstitials between such ribs. The spiral orientation of stringers about formers may provide uniform robustness at any point on fuselage 112 such that if a portion sustains damage, another portion may remain largely unaffected. Aircraft skin 124 may be attached to underlying stringers and formers and may interact with a fluid, such as air, to generate lift and perform maneuvers.

In one or more embodiments, fuselage 112 may include a monocoque construction. A monocoque construction may include a primary structure that forms a shell, such as skin 124, and supports physical loads. Monocoque fuselages are fuselages in which aircraft skin or shell is also the primary structure. In a monocoque construction, aircraft skin 124 may support tensile and compressive loads within itself and may, in some exemplary embodiments, be characterized by the absence of internal structural elements. Aircraft skin 124 in this construction method is rigid and can sustain its shape with no structural assistance from underlying skeleton-like elements. In one or more non-limiting embodiments, a monocoque fuselage may include an aircraft skin made from plywood layered in varying grain directions, epoxy-impregnated fiberglass, carbon fiber, or any combination thereof.

In one or more embodiments, fuselage 112 may include a semi-monocoque construction. A semi-monocoque construction, as used in this disclosure, is a partial monocoque construction, where a monocoque construction is describe above in detail. In a semi-monocoque construction, fuselage 112 may derive some structural support from stressed skin 124 and some structural support from an underlying frame structure made of structural elements. Formers or station frames can be seen running transverse to the longitudinal axis of fuselage 112 with circular cutouts which are generally used in real-world manufacturing for weight savings and for the routing of electrical harnesses and other modern on-board systems. In a semi-monocoque construction, stringers may include thin, long strips of material that run parallel to longitudinal axis of fuselage 112. Stringers may be mechanically connected to formers permanently, such as with rivets. Skin 124 may be mechanically connected to stringers and formers permanently, such as by rivets as well. A person of ordinary skill in the art will appreciate, upon reviewing the entirety of this disclosure, that there are numerous methods for mechanical fastening of components like screws, nails, dowels, pins, anchors, adhesives like glue or epoxy, or bolts and nuts, to name a few. A subset of fuselage under the umbrella of semi-monocoque construction includes unibody vehicles. Unibody, which is short for "unitized body", or alternatively "unitary construction", vehicles are characterized by a construction in which the body, floor plan, and chassis form a single structure. A unibody may be characterized by internal structural elements like formers and stringers being constructed in one piece, integral to aircraft skin as well as any floor construction like a deck.

Still referring to FIG. 1, stringers and formers, which may account for the bulk of an aircraft structure, excluding monocoque construction, and may be arranged in a plurality of orientations depending on aircraft operation and materials. Stringers may be arranged to carry axial (tensile or compressive), shear, bending or torsion forces throughout their overall structure. Due to their connection to aircraft skin, aerodynamic forces exerted on skin 124 will be transferred to stringers. A location of stringers greatly informs the type of forces and loads applied to each and every stringer, all of which may be handled by material selection, cross-sectional area, and mechanical connecting methods of each member. A similar assessment may be made for formers. In general, formers may be significantly larger in cross-sectional area and thickness, depending on location, than stringers. Both stringers and formers may include aluminum, aluminum alloys, graphite epoxy composite, steel alloys, titanium, or an undisclosed material alone or in combination.

In one or more embodiments, stressed skin, when used in semi-monocoque construction, is the concept where the skin of an aircraft bears partial, yet significant, load in an overall structural hierarchy. In other words, an internal structure, whether it be a frame of welded tubes, formers and stringers, or some combination, may not be sufficiently strong enough by design to bear all loads. The concept of stressed skin may be applied in monocoque and semi-monocoque construction methods of airframe 116, such as fuselage 112 or wings. In some forms of monocoque construction, only structural skin, and in that sense, aircraft skin 124 undergoes stress by applied aerodynamic fluids imparted by the fluid. Stress as used in continuum mechanics may be described in pound-force per square inch (lbf/in$^2$) or Pascals (Pa). In semi-monocoque construction, stressed skin may bear part of aerodynamic loads and additionally may impart force on an underlying structure of stringers and formers.

Still referring to FIG. 1, aircraft 104 may include a plurality of laterally extending elements attached to fuselage 112. As used in this disclosure a "laterally extending element" is an element that projects essentially horizontally from a fuselage, including an outrigger, a spar, and/or a fixed wing that extends from fuselage. Wings 128 may be structures which may include airfoils configured to create a pressure differential resulting in lift. Wings 128 may generally be disposed on the left and right sides of aircraft 104 symmetrically, at a point between a nose and empennage. Wings 128 may include a plurality of geometries in planform view: swept swing, tapered, variable wing, triangular, oblong, elliptical, square, among others. A wing's cross-sectional geometry may include an airfoil. For the purposes of this disclosure, an "airfoil" is a shape specifically designed such that a fluid flowing above and below it exert differing levels of pressure against the top and bottom surface. In one or more embodiments, a bottom surface of aircraft 104, or the surface that generally is facing the ground during taxing or flight, may generate a greater pressure than does the top of aircraft 104, resulting in lift. A laterally extending element may include differing and/or similar cross-sectional geometries over its cord length or the length from wing tip to where wing meets aircraft's body, or fuselage. One or more wings may be symmetrical about aircraft's longitudinal plane, which includes the longitudinal or roll axis reaching down the center of the aircraft through the nose and empennage, and plane's yaw axis. Laterally extending element, such as wing 128, may include controls surfaces configured to be commanded by a pilot or pilots to change a wing's geometry and therefore its interaction with a fluid medium, like air. Control surfaces may include flaps, ailerons, tabs, spoilers, and slats, among others. The control surfaces may dispose on wings in a plurality of locations and arrangements and in embodiments may be disposed at the leading and trailing edges of the wings, and may be configured to deflect up, down, forward, aft, or a combination thereof. An aircraft, including a dual-mode aircraft, may include a combination of control surfaces to perform maneuvers while flying or taxing.

Still referring to FIG. 1, aircraft 104 may include a plurality of flight components. As used in this disclosure a "flight component" is a component that promotes flight and guidance of an aircraft. In one or more embodiments, a flight component may include a propulsor, such as, for example, a propeller or thrust engine. In one or more embodiments, a flight component includes an aerodynamic surface. An aerodynamic surface may include an aileron, an edge slat, an elevator, a rudder, balance and anti-balance tabs, flaps, spoilers, a trim, a mass balance, and the like. In an embodiment, flight component may be mechanically coupled to an aircraft. As used in this disclosure, a person of ordinary skill in the art would understand "mechanically connected" to mean that at least a portion of a device, component, or circuit is connected to at least a portion of aircraft 104 via a mechanical connection. A mechanical connection may include, for example, a rigid connection, such as beam connection, bellows connection, bushed pin connection, constant velocity, split-muff connection, diaphragm connection, disc connection, donut connection, elastic connection, flexible connection, fluid connection, gear connection, grid connection, hirth joints, hydrodynamic connection, jaw connection, magnetic connection, Oldham connection, sleeve connection, tapered shaft lock, twin spring connection, rag joint connection, universal joints, or any combination thereof. In an embodiment, mechanical connection may be used to connect the ends of adjacent parts and/or objects of an electric aircraft. Furthermore, in an embodiment, mechanical connection may be used to join two pieces of rotating electric aircraft components.

Figure 2:
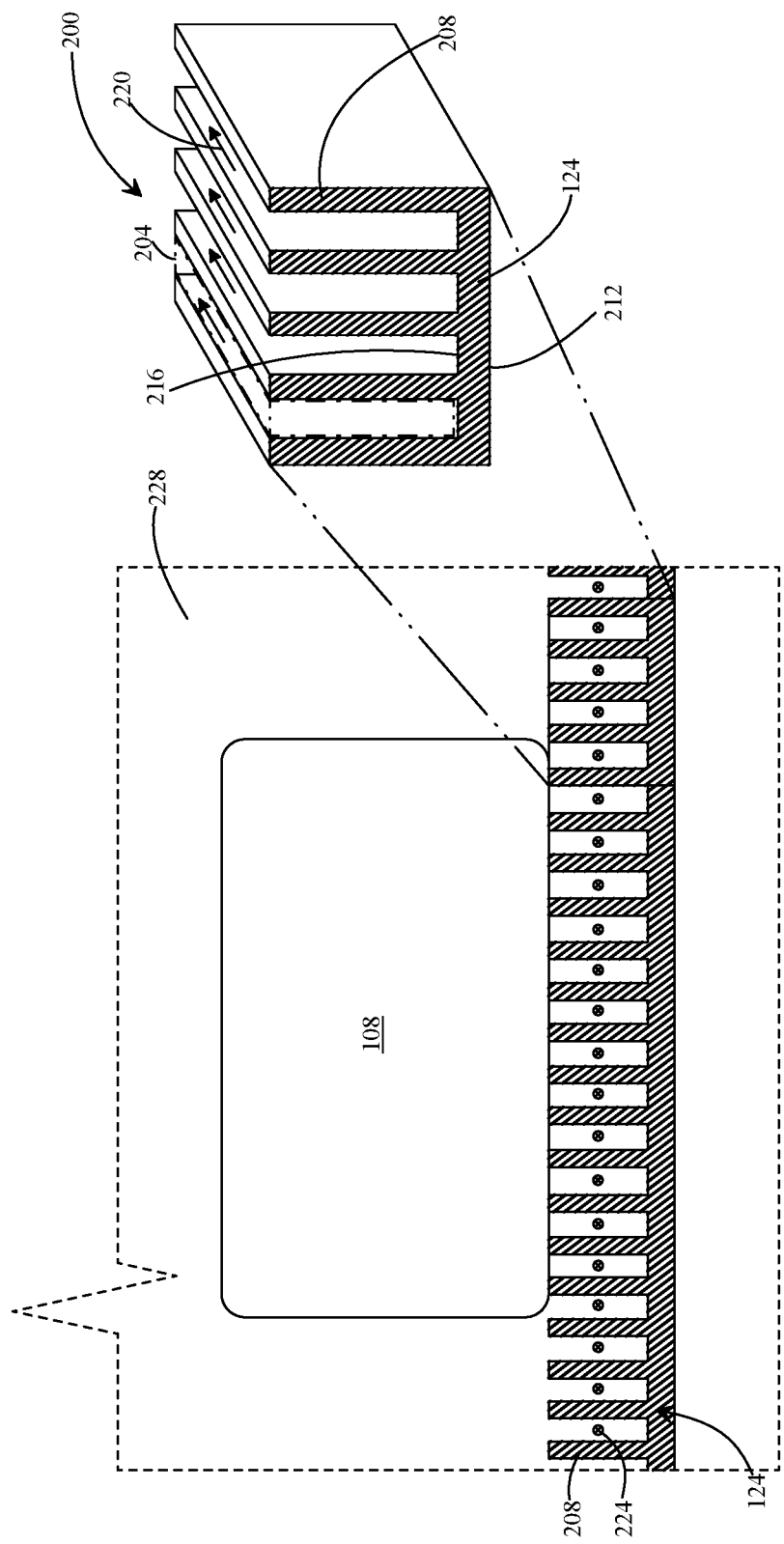
FIG. 2 is a diagrammatic representation illustrating a second exemplary embodiment of thermal management apparatus in accordance with one or more embodiments of the present disclosure.

Now referring to FIG. 2, a cross-sectional view of an exemplary embodiment of integrated thermal management apparatus 200 is shown in accordance with one or more embodiments of the present disclosure. As previously mentioned, airframe 116 may include skin 124, components such as fuselage 112 and wings 128, and other various structural elements used to construct such components. In various embodiments, one or more energy sources 108 may be disposed within fuselage 112. For example, and without limitation, energy source 108 may be disposed within a payload bay, battery bay, or other compartment and/or cavity of fuselage 112. In one or more embodiments, energy source 108 may include one or more battery packs. Battery pack may be consistent with disclosure of battery pack in U.S. patent application Ser. No. 17/348,960 filed on Jun. 16, 2021, and titled "BATTERY PACK FOR ELECTRIC VERTICAL TAKE-OFF AND LANDING AIRCRAFT", which is incorporated in its entirety herein by reference. Battery pack may include one or more thermal diffusers such as heat sinks, heat pumps, heat pipes, conducting plates, and conducting fins. The thermal diffusers may extend from battery pack to dissipate heat away from the battery pack. Fuselage 112 may be configured to carry passengers and/or cargo in an area accessible via a passenger entrance. In some embodiments, energy source 108 may be located beneath a floor of fuselage 112, such that energy source 108 is disposed between the floor and skin 124 of fuselage 112.

With continued reference to FIG. 2, and in various embodiments, underbelly 132 of fuselage 112 may include apparatus 200. For instance, skin 124 of underbelly 132 may define apparatus 200. Skin 124 may include an outer surface 212, which faces an external environment of aircraft 104, and an inner surface 216, which faces and/or at least partially defines an interior cavity 228 of aircraft 104. In one or more embodiments, skin 124 may include one or more fins 208, which each extend from a surface, such as an interior surface 216, of skin 124. For example, and without limitation, fins 208 may include a plurality of fins. In one or more embodiments, heat from energy source 108 may be dissipated into apparatus 200, through fins 208, and into surrounding ambient air 228 of energy source 108. For example, apparatus may act as a heat sink to reduce or maintain a temperature of energy source 108 and prevent energy source 108 from overheating. In some embodiments, fins may extend at an orthogonal angle from interior surface 216, as shown in FIG. 2. In other embodiments, fins may extend at an acute or obtuse angle from interior surface 216 of skin 124. Fins 208 may be various shapes and sizes, as discussed further in this disclosure. For instance, and without limitation, fins 208 may be plate fins that extend longitudinally along surface 216 of skin 124. Fins 208 may include longitudinal faces that define channels 204 of skin 124, as shown in FIG. 2. In other embodiments, fins 208 may include pin fins.

Still referring to FIG. 2, fins 128 may be made from various materials. For example, fins 128 may be composed from the same material as surrounding skin 124. In other embodiments, fins 128 may be composed of a material different from the rest of skin 124. Fins 128 may be composed of materials such as aluminum, metal alloys, other thermally conductive materials, and the like. In some embodiments, each fin 128 may be a slat, where fins overlap each other. In other embodiments, fins 128 may not overlap at all. As understood by one of ordinary skill in the art, fins 128 may be various shapes and sizes. For instance, and without limitation, each fin 128 may be a rectangular shape (as shown in FIG. 2). In other embodiments, each fin 128 may be a polygonal shape, such as a quadrilateral or parallelogram. In other exemplary embodiments, each fin 128 may have at least one curved and/or arcuate edge. For example, and without limitation, each fin 128 may be a semicircular shape or a reuleaux triangle shape. In some embodiments, fins 128 may each have a substantially straight surface and/or face. In other embodiments, each fin 128 may include a curved surface and/or face. Fins 128 may be various thicknesses and/or lengths. In some embodiments, fins 128 may each be a different shape and/or size from each other. In other embodiments, fins 128 may be uniform shapes and/or sizes relative to each other.

Still referring to FIG. 2, fins 128 may at least partially define one or more channels 204. For the purposes of this disclosure, a "channel" is a space disposed between fins of apparatus 100 that allow for a coolant to circulate therethrough. Channels 204 may be opened or closed to control coolant flow therethrough. In some embodiments, channels 204 may opened or closed independently. In various embodiments, channels 204 may be opened or closed using fins 128. As discussed further in this disclosure. Fins 128 may be operated independently or in unison to open or close channels 204, as discussed further in this disclosure. For example, and without limitation, fins 128 may be each independently moveable. In various embodiments, each channel 204 may be a groove disposed between a pair of fins 208. As understood by one skilled in the art, fins 208 and channels 204 may be various shapes or sizes that allow for heat to be dissipated from energy source 108. In one or more embodiments, fins 128 may be in thermal connection with energy source 128 so that heat may be extracted from energy source 108 by fins 128. In other embodiments, thermal energy of energy source 108 may be extracted from energy source 108 by a coolant, which may be in thermal connection energy source 108 and/or fins 128. The thermal energy may thus be transferred and/or dispersed into ambient air 228 and/or coolant. For the purposes of this disclosure, a "thermal connection" is a direct or indirect connection that allows exchange of thermal energy. Energy source 108 being in thermal connection with coolant may include energy source 108 being in direct or indirect communication with a flow path of coolant so that coolant is able to exchange heat energy with energy source 108. For example, and without limitation, coolant may receive heat energy from energy source 108 to be dissipated by apparatus 100. Transfer of heat from energy source 108 may reduce or maintain a temperature of energy source 108. A coolant may include a fluid used to reduce and/or regulate a temperature of a system. Coolant may absorb heat from a nearby or abutting body, thus lowering heat energy of the body. In some embodiments, coolant may include ambient air. In other embodiments, coolant may include a liquid, such as water or glycol. In one or more embodiments, channels 204 may allow coolant to flow (as indicated by directional arrow 220) through apparatus 200. For instance, and without limitation, each channel 204 may receive a coolant tubing 224 that actively, e.g., using a pump, circulates coolant through apparatus 200. In some embodiments, coolant tubing may be a flexible tube, such as, for example, a polymer tube with a hollow interior that allows for a fluid coolant to traverse therethrough. On other embodiments, tubing may be a rigid tube, such as a metal tube. As understood by one or ordinary skill in the art, coolant tubing may be any shape or size that allows tubing to be disposed within channel 204 and/or between fins 208. For example, and without limitation, tubing may be a shape complementary to channel 204. In one or more embodiments, channel 204 may act as a guide that coolant may directly traverse through, passively or actively.

Figure 3:
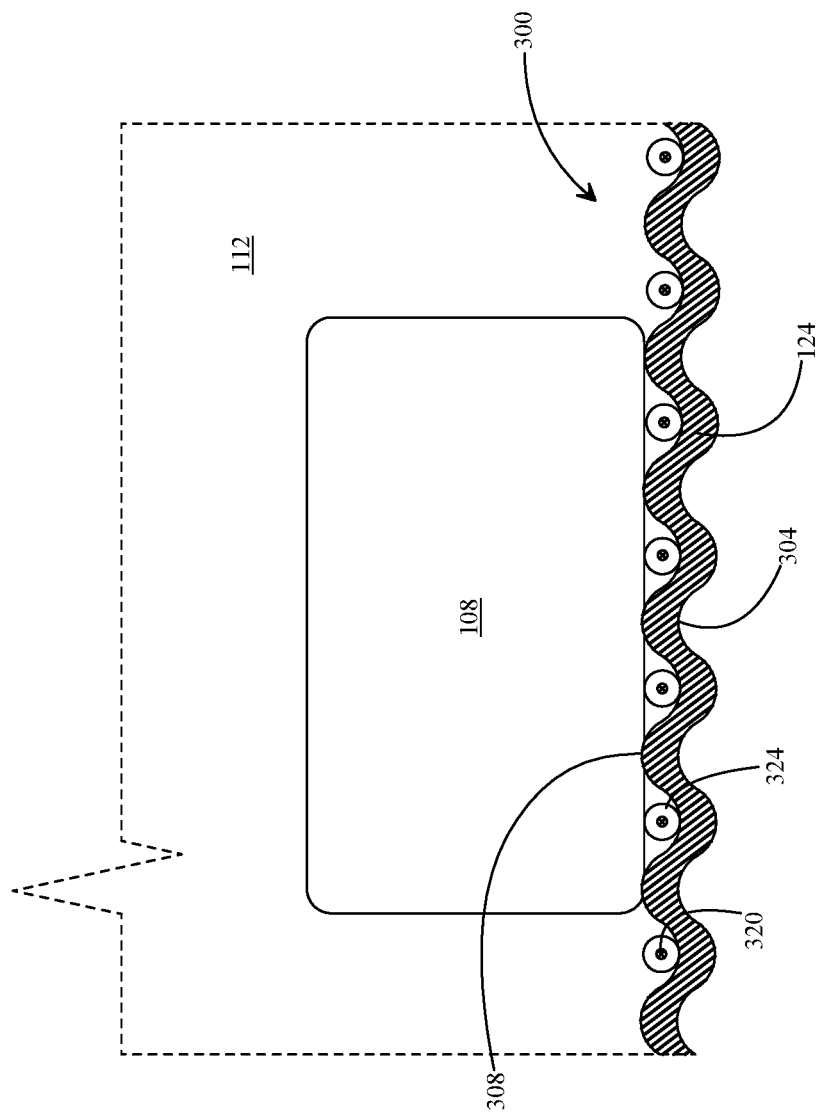
FIG. 3 is a diagrammatic representation illustrating a third exemplary embodiment of thermal management apparatus in accordance with one or more embodiments of the present disclosure.

Now referring to FIG. 3, a cross-sectional view of an exemplary embodiment of integrated thermal management apparatus 300 is shown. In one or more embodiments, apparatus 300 may include a corrugated surface. In some embodiments, interior surface 216 may be corrugated only. In other embodiments, interior surface 216 and exterior surface 212 may both be corrugated. Apparatus 300 may include fins 308 that have sloped surfaces and/or arcuate peaks. Disposed between each pair of fins 308 may be a channel 304 with a trough. In some embodiments, a coolant, such as ambient air, may passively circulate through channels 308 along a flow path (as indicated by directional arrow 320), as previously described above. In other embodiments, coolant, such as a gas or a liquid, flow along flow path 320 within coolant tubing 324, which is disposed within channels 304.

Figure 4A:
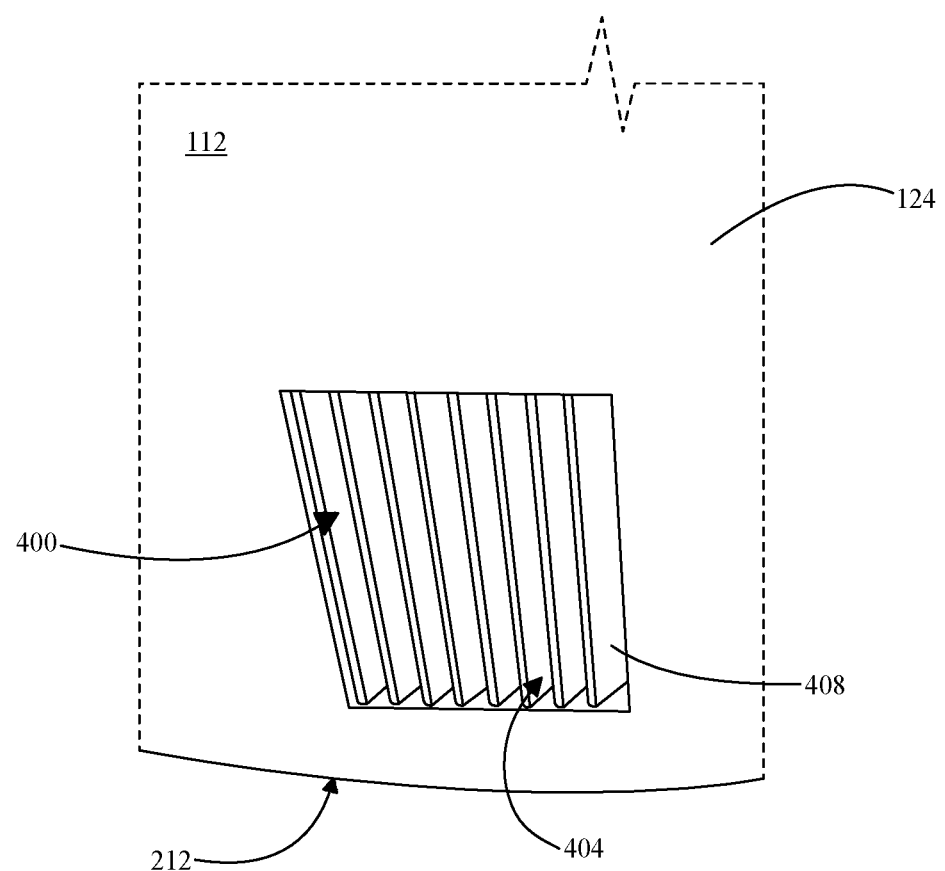
FIGS. 4A-4C are various diagrammatic representations illustrating a fourth exemplary embodiment of thermal management apparatus in accordance with one or more embodiments of the present disclosure
Figure 4C:
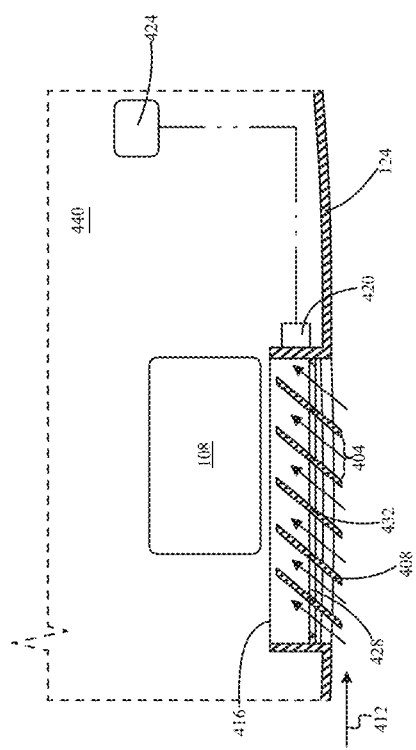
Figure 4B:
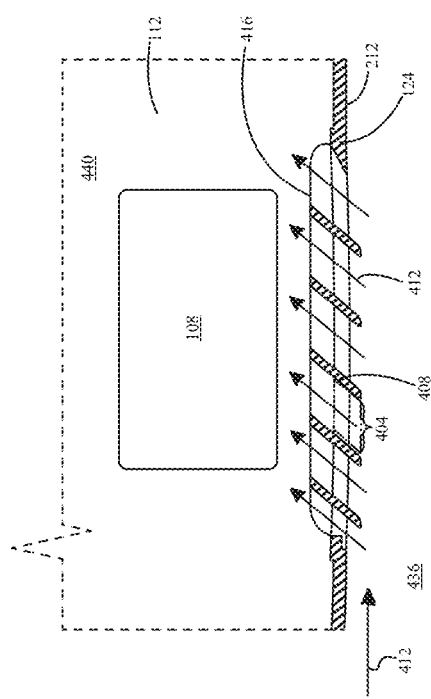

Now referring to FIGS. 4A-4C, various views of an exemplary embodiment of apparatus 400 is shown. As shown in FIG. 4A, apparatus 100 may be defined by skin 124, where skin 124 has apertures 404 disposed therein that allow a coolant, such as ambient air, to traverse therethrough. Apertures 404 allow for fluidic communication between an external environment 436 of aircraft 104 and cavity 440 of fuselage 112, which energy source 108 is disposed within (shown in FIGS. 4A and 4B). In various embodiments, apertures 404 may be cutouts of skin 124.

As shown in FIG. 4B, and in various embodiments, apparatus 400 includes fins 408 that define one or more apertures 404. For instance, apparatus 400 may include a vent, such as a louver where a coolant may traverse between slats, such as fins 408, and through apertures 404. In one or more nonlimiting embodiments, each aperture 404 may be disposed between a pair of slats. Fins 408 may be configured to redirect coolant to flow around or through energy source 108. In some embodiments, fins 408 may be in an orthogonal arrangement (as shown in FIG. 2), where a length of each fin 408 is perpendicular to a length of the fuselage 112 and thus perpendicular to a longitudinal axis of aircraft 104. In other embodiments, fins 408 may be in a parallel arrangement, where the length of each fin is parallel to the length of fuselage 112 and thus parallel to a longitudinal axis of aircraft 104. As understood by one of ordinary skill in the art, fins may be positioned in other various arrangements. For example, and without limitation, fins 408 may be uniformly arranged, nonuniformly arranged, at various angles relative to a length of fuselage 112, and the like. Furthermore, though fins 408 are shown as straight surfaces, as understood by one of ordinary skill in the art, fins 408 may be various shapes and sizes. For example, and without limitations, each fin 408 may have a straight surface, an undulated surface, an arcuate surface, any combination thereof, and the like. Similarly, apertures 404 may me various shapes, sizes, and arrangements. Peaks of fins 208 of skin 124 may protrude from (shown in FIGS. 4A and 4B), be recessed within (shown in FIG. 2), or be flush with surrounding skin 124, such as an outer surface 212 or interior surface 216 of skin 124.

Still referring to FIG. 4B, apparatus 400 may be a monolithic component. For example, apparatus may be a singular unit that is fully integrated into fuselage 112. In other embodiments, apparatus 400 may include assembled components. For example, and without limitations, apparatus 400 may include a frame that fins 408 are attached to that may be removed from fuselage 112. This may be used to replaced apparatus in case of damage or regular wear. In another example, and without limitations, fins 408 may be directly attached to fuselage 112 and individually removeable.

Still referring to FIG. 4B, fins 408 may be angled relative to outer surface 212 of skin 124. For example, fins 408 may be at an acute angle, obtuse angle, or perpendicular angle to coolant flow path 412. Fins 408 may be angled so as to minimally modify OML of aircraft 104 while still redirecting coolant flow toward energy source 108.

Still referring to FIG. 4B, in some embodiments, cavity 308 of fuselage 112 may include a compartment 440 that energy source 108 is disposed within. For example, and without limitation, cavity 308 may include a battery bay for storing energy source 108, a payload/cargo bay, a compartment defined by structural elements of airframe 116, and the like. As previously mentioned, fins 408 of apparatus 400 may direct a flow (indicated by directional arrow 412) of coolant into cavity 440 to regulate a temperature of energy source 108. Fins 408 may be arranged so as to control coolant flow 412 as desired. For example, and without limitation, fins 408 may be moveable to control the direction and/or amount of coolant flowing through apertures 404, as discussed further below in this disclosure. In some embodiments, apertures 404 may be in fluidic communication with one or more cooling channels attached to energy source 108. Cooling channels may abut energy source 108 or traverse through energy source 108.

Still referring to FIG. 4B, apparatus 400 may include a divider 416 configured to prevent debris from traversing through apertures 404. In some embodiments, divider may be a screen, such as a metal screen or grate. In other embodiments, divider 416 may be a filter, such as a rigid cotton or fiber filter. In some embodiments, divider may be rigid enough to support a weight of energy source 108. For example, and without limitation, energy source 108 may abut or sit atop of divider 316. In one or more embodiments, apparatus 100 may be fixed or moveable, where fins 408 may be fixed relative to fuselage 112 or moveable relative fuselage 112.

As shown in FIG. 4C, and as previously mentioned, fins 408 of apparatus 400 may be moveable and/or adjustable. For instance, fins 408 may be moveable so as to act like actuatable shutters of a vent. For example, and without limitation, fins 408 may be moveable between an open position and a closed position. In the open position, apertures 404 may allow coolant flow 412 between external environment 436 and cavity 440. In the closed position, fins 408 block and/or diminish apertures 404 to size that significantly reduces or ceases flow 412 of coolant between external environment 436 and cavity 440. In various embodiments, apparatus 400 may move between the open position and closed position automatically. For example, and without limitation, fins 408 may rest in a closed position when aircraft 104 is not moving; however, once aircraft begins to move airflow around fins 408 forces them open, allowing coolant to flow through apertures 404. In other embodiments, apparatus 400 may be moved between the open position and closed position manually. For example, and without limitation, a user, such as aground crew, may physically move fins into open position or closed position by biasing fins 408 or a lever connected to one or more fins 408. In other embodiments, apparatus 400 may move between open position and closed position by actuation of fins 408. For example, and without limitation, an actuator 420 may be used to move fins 408 upon receiving of a control signal from a controller 424, such as a computing device. Controller 424 is communicatively connected to actuator 420 so that controller 424 may provide an electrical signal, such as a control signal, to actuator, which converts the electrical signal into a mechanical movement, such as a mechanical movement of fins 408. Actuator 320 may be connected to fins 208 using, for example and without limitation, an arm 428. Arm may be mechanically connected to each fin 408, such as at a pivot point 432, so that upon movement of arm 428 by actuator 420, each fin 408 is moved. Apparatus 400 may be composed wholly or partially of any suitable material, such as aluminum, fiberglass, and/or carbon fiber. Fins 408 may include a sealing material such as an elastomer, rubber, plastic, or a combination thereof to provide a seal between fins 208 when fins 208 are in closed position. Thus, in closed position, fins 408 may bias adjacent fins to create an airtight seal that prevents air from traversing between external environment 436 and cavity 440.

Still referring to FIG. 4C, apparatus 400 may include actuator 420, where moveable fins 208 may be mechanically attached to actuator 420. In some nonlimiting embodiments, actuator 420 may include a plurality of actuators configured to each move a fin 408. Actuator 420 may be configured to move fins 408 between an open position and closed position. In one or more nonlimiting embodiments, actuator 420 may include pneumatic pistons, hydraulic pistons, and/or solenoids, piezoelectric actuators, and the like. Actuator 420 may include linear actuators, rotary actuators, hydraulic actuators, electric actuators, mechanical actuators, and the like. For example, and without limitation, actuator 420 may include a hydraulic piston that extends or retracts, moving a mechanically connected arm 428 and causing fins 408 to open or shut. In another example, actuator 420 may include a solenoid. Similarly, actuator 420 may be triggered by electrical power, pneumatic pressure, hydraulic pressure, and the like. Actuator 420 may also include electrical motors, servomotors, cables, and the like.

Still referring to FIG. 4C, apparatus 400 may include controller 424, which may be, for example and without limitation, a pilot control, that is communicatively connected to actuator 420 and configured to generate a command, such as a control signal, to actuator 420. Pilot control, which may include or be communicatively connected to controller 424, may include a pilot interfacing component including, but not limited to, a button, toggle, level, touchscreen, joystick, switch, and the like that initiates an electric signal, such as a control signal, where the control signal instructs actuator 420 to move fins 408 into open or closed position. Pilot control may be physically located in the cockpit of electric aircraft 104 or remotely located outside of aircraft 104 in another location communicatively connected to at least a portion of electric aircraft 104. Controller 424 may include a computing device. Controller 424 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of the system and/or computing device. Actuator 420 may incorporate and/or be communicatively connected to controller 424, such as a computing device or a plurality of computing devices, consistent with the entirety of this disclosure.

In one or more embodiments, controller 424 may be designed and/or configured to perform any method, method step, or sequence of method steps in any embodiment described in this disclosure, in any order and with any degree of repetition. For instance, controller 424 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 424 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 4C, apparatus 400 may include one or more sensors that each communicatively connects to a connector and/or actuator 420. As used in this disclosure, a sensor may include any device, module, and/or subsystems, utilizing any hardware, software, or any combination thereof to detect phenomenon and/or characteristics in a surrounding environment and communicate and/or transmit the information. Sensor may be mechanically and/or communicatively connected, as described above, to electric aircraft 104. Sensor may be incorporated into electric aircraft or be remote. In one or more embodiments, sensor may include, as an example and without limitation, an environmental sensor. As used herein, an environmental sensor may be used to detect ambient temperature, barometric pressure, air velocity, motion sensors which may include gyroscopes, accelerometers, inertial measurement unit (IMU), various magnetic, humidity, and/or oxygen. As another non-limiting example, sensor may include a geospatial sensor. As used in this disclosure, a geospatial sensor may include optical/radar/Lidar, GPS. In an embodiment, an environmental sensor may sense one or more environmental conditions or parameters outside electric aircraft 104, inside the electric aircraft 104, or within or at any component thereof, including without limitation, energy source 108. The environmental sensor may further collect environmental information from the predetermined landing site, such as ambient temperature, barometric pressure, air velocity, motion sensors which may include gyroscopes, accelerometers, inertial measurement unit (IMU), various magnetic, humidity, and/or oxygen. The information may be collected from outside databases and/or information services, such as Aviation Weather Information Services. Sensor may detect an environmental parameter, a temperature, a barometric pressure, a location parameter, and/or other necessary measurements. Sensor may detect voltage, current, or other electrical connection via a direct method or by calculation. This may be accomplished, for instance, using an analog-to-digital converter, one or more comparators, or any other components usable to detect electrical parameters using an electrical connection that may occur to any person skilled in the art upon reviewing the entirety of this disclosure. Persons skilled in the art, upon reviewing the entirety of this disclosure, will be aware of various ways to monitor the status of the system of both critical and non-critical functions. In one or more embodiments, sensor may be communicatively connected to energy source 108 so that sensor may monitor a temperature of energy source 108 and/or a surrounding environment of energy source 108, such as cavity 308. Sensor may include a battery management system of energy source 108 for monitoring a state and/or condition of energy source 108. A battery management system may be consistent with a battery monitoring units disclosed in U.S. patent application Ser. No. 17/529,653, entitled "ELECTRIC AIRCRAFT BATTERY PACK AND METHODS OF USE", U.S. patent application Ser. No. 17/529,447, entitled "MODULE MONITOR UNIT FOR AN ELECTRIC AIRCRAFT BATTERY PACK AND METHODS OF USE", U.S. patent application Ser. No. 17/529,583, entitled "PACK MONITORING UNIT FOR AN ELECTRIC AIRCRAFT BATTERY PACK AND METHODS OF USE FOR BATTERY MANAGEMENT", and U.S. patent application Ser. No. 17/827,002, entitled "ELECTRIC AIRCRAFT AND METHOD OF COOLING A BATTERY PACK", all of which are incorporated herein by reference in their entirety.

With continued reference to FIG. 3B, actuator may be configured to move fins 208 when a triggering event occurs. As used in this disclosure, a "triggering event" is an event that is measurable by sensor and upon receipt of the measurement for the sensor results in controller 424 initiating a command, such as a transmitted control signal, to move fins 408 into an open position or closed position. Triggering event may be pre-programmed in controller 424 or may include instructions stored in a memory communicatively connected to controller 424 that then configures controller 424 to execute certain steps and processes. Triggering event may include, for example and without limitation, when sensor detects a current temperature of energy source 108 that controller 424 determines exceeds a preconfigured threshold. For example, and without limitation, if a temperature of energy source 108, as detected by sensor, is determined by controller 424 to exceed an acceptable operating temperature of energy source 108, then controller 424 may transmit a control signal that instructs actuator to move fins 408 into an open position so that coolant, e.g., air, may flow through cavity 440 and lower the temperature of energy source 108 to a temperature that is below preconfigured threshold.

Figure 5:
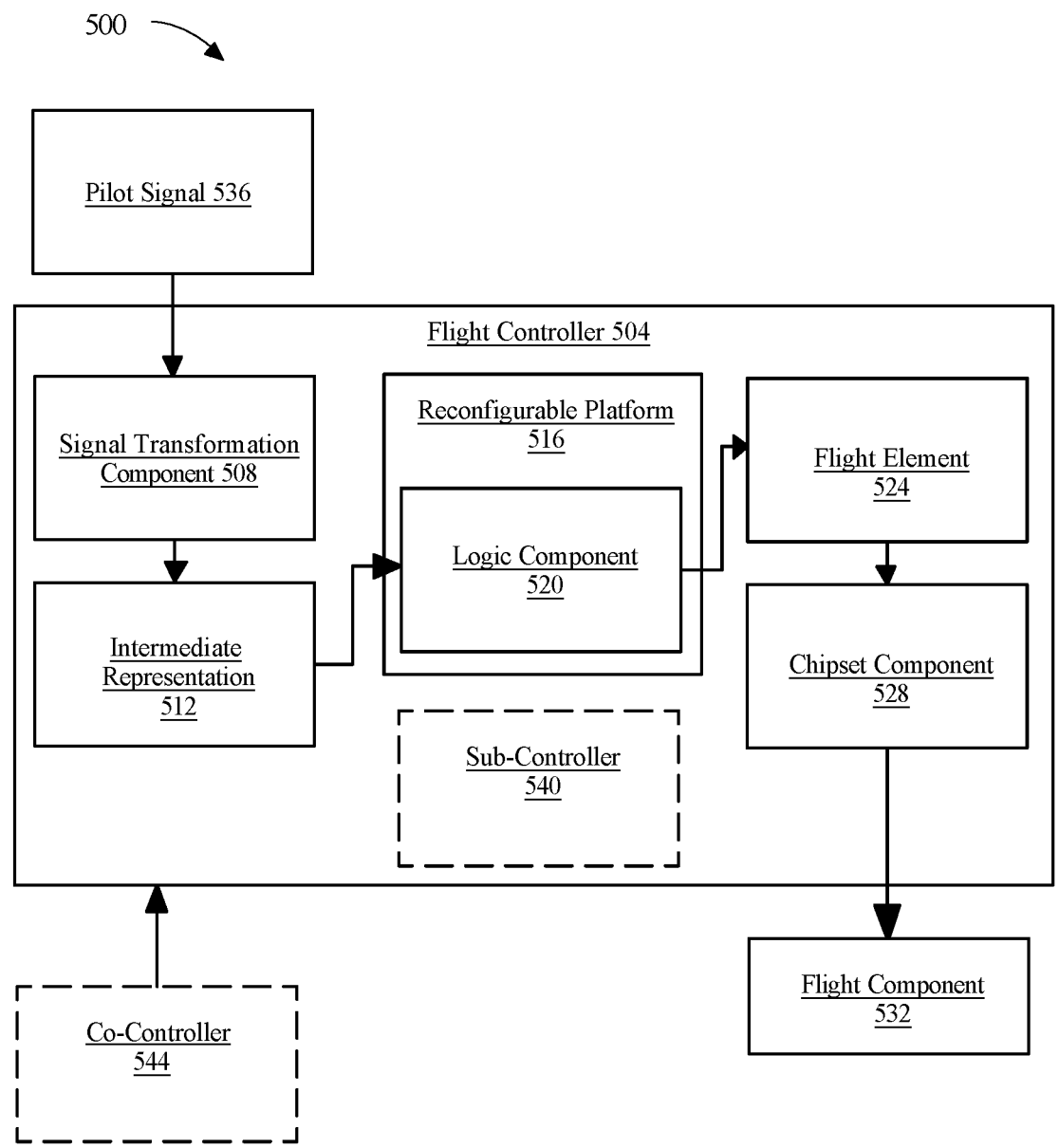
FIG. 5 is a block diagram of a flight controller in accordance with one or more embodiments of the present disclosure.

Now referring to FIG. 5, an exemplary embodiment 500 of a flight controller 504 is illustrated. As used in this disclosure a "flight controller" is a computing device of a plurality of computing devices dedicated to data storage, security, distribution of traffic for load balancing, and flight instruction. In one or more embodiments, flight controller 504 may include controller 424. In other embodiments, flight controller 504 may include a computing device, such as computing device 600. Flight controller 504 may include and/or communicate with any computing device as described in this disclosure, including without limitation a microcontroller, microprocessor, digital signal processor (DSP) and/or system on a chip (SoC) as described in this disclosure. Further, flight controller 504 may include a single computing device operating independently, or may include two or more computing device operating in concert, in parallel, sequentially or the like; two or more computing devices may be included together in a single computing device or in two or more computing devices. In embodiments, flight controller 504 may be installed in an aircraft, may control the aircraft remotely, and/or may include an element installed in the aircraft and a remote element in communication therewith.

In an embodiment, and still referring to FIG. 5, flight controller 504 may include a signal transformation component 508. As used in this disclosure a "signal transformation component" is a component that transforms and/or converts a first signal to a second signal, wherein a signal may include one or more digital and/or analog signals. For example, and without limitation, signal transformation component 508 may be configured to perform one or more operations such as preprocessing, lexical analysis, parsing, semantic analysis, and the like thereof. In an embodiment, and without limitation, signal transformation component 508 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 508 may include transforming one or more low-level languages such as, but not limited to, machine languages and/or assembly languages. For example, and without limitation, signal transformation component 508 may include transforming a binary language signal to an assembly language signal. In an embodiment, and without limitation, signal transformation component 508 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 5, signal transformation component 508 may be configured to optimize an intermediate representation 512. As used in this disclosure an "intermediate representation" is a data structure and/or code that represents the input signal. Signal transformation component 508 may optimize intermediate representation as a function of a data-flow analysis, dependence analysis, alias analysis, pointer analysis, escape analysis, and the like thereof. In an embodiment, and without limitation, signal transformation component 508 may optimize intermediate representation 512 as a function of one or more inline expansions, dead code eliminations, constant propagation, loop transformations, and/or automatic parallelization functions. In another embodiment, signal transformation component 508 may optimize intermediate representation as a function of a machine dependent optimization such as a peephole optimization, wherein a peephole optimization may rewrite short sequences of code into more efficient sequences of code. Signal transformation component 508 may optimize intermediate representation to generate an output language, wherein an "output language," as used herein, is the native machine language of flight controller 504. For example, and without limitation, native machine language may include one or more binary and/or numerical languages.

In an embodiment, and without limitation, signal transformation component 508 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 5, flight controller 504 may include a reconfigurable hardware platform 516. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 516 may be reconfigured to enact any algorithm and/or algorithm selection process received from another computing device and/or created using machine-learning processes.

Still referring to FIG. 5, reconfigurable hardware platform 516 may include a logic component 520. As used in this disclosure a "logic component" is a component that executes instructions on output language. For example, and without limitation, logic component may perform basic arithmetic, logic, controlling, input/output operations, and the like thereof. Logic component 520 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 520 may be organized according to Von Neumann and/or Harvard architecture as a non-limiting example. Logic component 520 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 520 may include one or more integrated circuit microprocessors, which may contain one or more central processing units, central processors, and/or main processors, on a single metal-oxide-semiconductor chip. Logic component 520 may be configured to execute a sequence of stored instructions to be performed on the output language and/or intermediate representation 512. Logic component 520 may be configured to fetch and/or retrieve the instruction from a memory cache, wherein a "memory cache," as used in this disclosure, is a stored instruction set on flight controller 504. Logic component 520 may be configured to decode the instruction retrieved from the memory cache to opcodes and/or operands. Logic component 520 may be configured to execute the instruction on intermediate representation 512 and/or output language. For example, and without limitation, logic component 520 may be configured to execute an addition operation on intermediate representation 512 and/or output language.

In an embodiment, and without limitation, logic component 520 may be configured to calculate a flight element 524. As used in this disclosure a "flight element" is an element of datum denoting a relative status of aircraft. For example, and without limitation, flight element 524 may denote one or more torques, thrusts, airspeed velocities, forces, altitudes, groundspeed velocities, directions during flight, directions facing, forces, orientations, and the like thereof. For example, and without limitation, flight element 524 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 524 may denote that aircraft is following a flight path accurately and/or sufficiently.

Still referring to FIG. 5, flight controller 504 may include a chipset component 528. As used in this disclosure a "chipset component" is a component that manages data flow. In an embodiment, and without limitation, chipset component 528 may include a northbridge data flow path, wherein the northbridge dataflow path may manage data flow from logic component 520 to a high-speed device and/or component, such as a RAM, graphics controller, and the like thereof. In another embodiment, and without limitation, chipset component 528 may include a southbridge data flow path, wherein the southbridge dataflow path may manage data flow from logic component 520 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 528 may manage data flow between logic component 520, memory cache, and a flight component 532. As used in this disclosure a "flight component" is a portion of an aircraft that can be moved or adjusted to affect one or more flight elements. For example, flight component 532 may include a component used to affect the aircrafts' roll and pitch which may comprise one or more ailerons. As a further example, flight component 532 may include a rudder to control yaw of an aircraft. In an embodiment, chipset component 528 may be configured to communicate with a plurality of flight components as a function of flight element 524. For example, and without limitation, chipset component 528 may transmit to an aircraft rotor to reduce torque of a first lift propulsor and increase the forward thrust produced by a pusher component to perform a flight maneuver.

In an embodiment, and still referring to FIG. 5, flight controller 504 may be configured generate an autonomous function. As used in this disclosure an "autonomous function" is a mode and/or function of flight controller 504 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 524. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 504 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 504 will control the ailerons and/or rudders. As used in this disclosure "non-autonomous mode" is a mode that denotes a pilot will control aircraft and/or maneuvers of aircraft in its entirety.

In an embodiment, and still referring to FIG. 5, flight controller 504 may generate autonomous function as a function of an autonomous machine-learning model. As used in this disclosure an "autonomous machine-learning model" is a machine-learning model to produce an autonomous function output given flight element 524 and a pilot signal 536 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 536 may denote that a pilot is controlling and/or maneuvering ailerons, wherein the pilot is not in control of the rudders and/or propulsors. In an embodiment, pilot signal 536 may include an implicit signal and/or an explicit signal. For example, and without limitation, pilot signal 536 may include an explicit signal, wherein the pilot explicitly states there is a lack of control and/or desire for autonomous function. As a further non-limiting example, pilot signal 536 may include an explicit signal directing flight controller 504 to control and/or maintain a portion of aircraft, a portion of the flight plan, the entire aircraft, and/or the entire flight plan. As a further non-limiting example, pilot signal 536 may include an implicit signal, wherein flight controller 504 detects a lack of control such as by a malfunction, torque alteration, flight path deviation, and the like thereof. In an embodiment, and without limitation, pilot signal 536 may include one or more explicit signals to reduce torque, and/or one or more implicit signals that torque may be reduced due to reduction of airspeed velocity. In an embodiment, and without limitation, pilot signal 536 may include one or more local and/or global signals. For example, and without limitation, pilot signal 536 may include a local signal that is transmitted by a pilot and/or crew member. As a further non-limiting example, pilot signal 536 may include a global signal that is transmitted by air traffic control and/or one or more remote users that are in communication with the pilot of aircraft. In an embodiment, pilot signal 536 may be received as a function of a tri-state bus and/or multiplexor that denotes an explicit pilot signal should be transmitted prior to any implicit or global pilot signal.

Still referring to FIG. 5, autonomous machine-learning model may include one or more autonomous machine-learning processes such as supervised, unsupervised, or reinforcement machine-learning processes that flight controller 504 and/or a remote device may or may not use in the generation of autonomous function. As used in this disclosure "remote device" is an external device to flight controller 504. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 5, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 504 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 5, flight controller 504 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 504. Remote device and/or FPGA may transmit a signal, bit, datum, or parameter to flight controller 504 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 504 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 5, flight controller 504 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 5, flight controller 504 may include, but is not limited to, for example, a cluster of flight controllers in a first location and a second flight controller or cluster of flight controllers in a second location. Flight controller 504 may include one or more flight controllers dedicated to data storage, security, distribution of traffic for load balancing, and the like. Flight controller 504 may be configured to distribute one or more computing tasks as described below across a plurality of flight controllers, which may operate in parallel, in series, redundantly, or in any other manner used for distribution of tasks or memory between computing devices. For example, and without limitation, flight controller 504 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 5, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 532. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 5, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 504. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 512 and/or output language from logic component 520, wherein output language may include one or more analog-to-digital conversions, low bit rate transmissions, message encryptions, digital signals, binary signals, logic signals, analog signals, and the like thereof described above in detail.

Still referring to FIG. 5, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 5, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 5, flight controller 504 may also be implemented using a "shared nothing" architecture in which data is cached at the worker, in an embodiment, this may enable scalability of aircraft and/or computing device. Flight controller 504 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 5, flight controller may include a sub-controller 540. As used in this disclosure a "sub-controller" is a controller and/or component that is part of a distributed controller as described above; for instance, flight controller 504 may be and/or include a distributed flight controller made up of one or more sub-controllers. For example, and without limitation, sub-controller 540 may include any controllers and/or components thereof that are similar to distributed flight controller and/or flight controller as described above. Sub-controller 540 may include any component of any flight controller as described above. Sub-controller 540 may be implemented in any manner suitable for implementation of a flight controller as described above. As a further non-limiting example, sub-controller 540 may include one or more processors, logic components and/or computing devices capable of receiving, processing, and/or transmitting data across the distributed flight controller as described above. As a further non-limiting example, sub-controller 540 may include a controller that receives a signal from a first flight controller and/or first distributed flight controller component and transmits the signal to a plurality of additional sub-controllers and/or flight components.

Still referring to FIG. 5, flight controller may include a co-controller 544. As used in this disclosure a "co-controller" is a controller and/or component that joins flight controller 504 as components and/or nodes of a distributer flight controller as described above. For example, and without limitation, co-controller 544 may include one or more controllers and/or components that are similar to flight controller 504. As a further non-limiting example, co-controller 544 may include any controller and/or component that joins flight controller 504 to distributer flight controller. As a further non-limiting example, co-controller 544 may include one or more processors, logic components and/or computing devices capable of receiving, processing, and/or transmitting data to and/or from flight controller 504 to distributed flight control system. Co-controller 544 may include any component of any flight controller as described above. Co-controller 544 may be implemented in any manner suitable for implementation of a flight controller as described above.

In an embodiment, and with continued reference to FIG. 5, flight controller 504 may be designed and/or configured to perform any method, method step, or sequence of method steps in any embodiment described in this disclosure, in any order and with any degree of repetition. For instance, flight controller 504 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It is to be noted that any one or more of the aspects and embodiments described in this disclosure may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described in this disclosure. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used in this disclosure, is intended to include a single medium as well as a collection of physically separate media, such as, for example, a collection of compact discs or one or more hard disk drives in combination with a computer memory. As used in this disclosure, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described in this disclosure.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
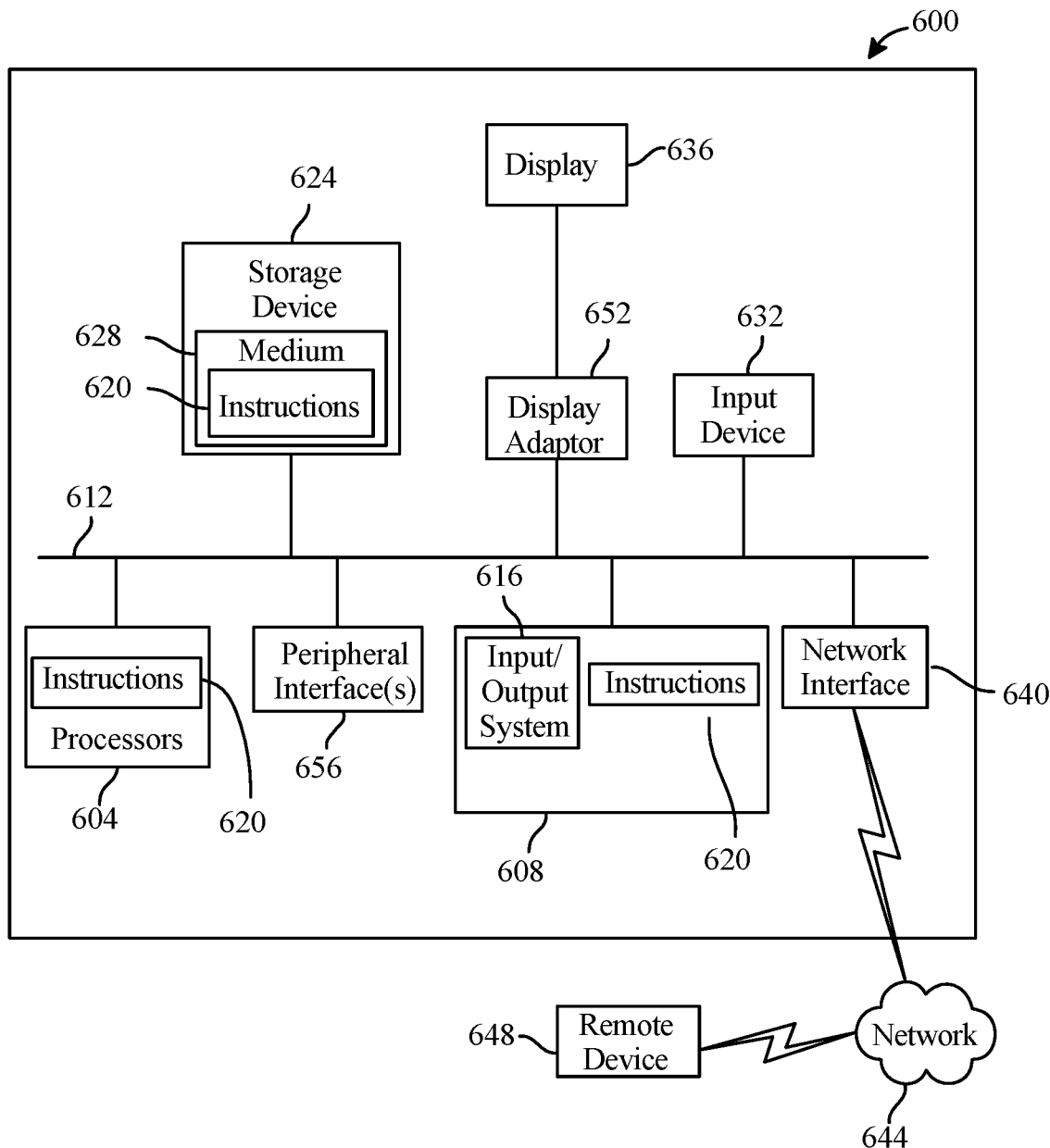
FIG. 6 is a block diagram of a computing system that may be used with such a system in accordance with one or more embodiments of the present disclosure.

Now referring to FIG. 6, a block diagram of an embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described in this disclosure is merely illustrative of the application of the principles of the present invention. Additionally, although particular methods in this disclosure may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed in this disclosure without departing from the spirit and scope of the present invention.

What is claimed is:

1. An integrated thermal management apparatus for regulating a temperature of an energy source of an electric aircraft, the apparatus comprising:
   a skin of an airframe of the electric aircraft, wherein the skin comprises:
   an interior surface;

a plurality of fins, wherein each fin of the plurality of fins extends from the interior surface, and wherein each fin of the plurality of fins is angled so as to reduce a modification of an outer mold line of the electric aircraft, and wherein each fin of the plurality of fins is:
  directly attached to a fuselage of the electric aircraft;
  independently moveable; and
  individually removable;
a plurality of channels, wherein each channel is at least partially defined by one or more of the plurality of fins;
wherein the plurality of channels facilitates flow of a coolant therethrough to extract thermal energy from an energy source in thermal connection with the coolant; and
a divider comprising a fiber filter configured to prevent debris traverse through a plurality of apertures, wherein the energy source sits atop of the divider.

2. The apparatus of claim 1, wherein the skin comprises a carbon fiber composite.

3. The apparatus of claim 1, wherein the skin comprises aluminum.

4. The apparatus of claim 1, wherein each channel of the plurality of channels is configured to receive a coolant tubing, wherein the coolant traverses through the coolant tubing.

5. The apparatus of claim 4, further comprising a pump that is configured to actively move coolant through coolant tubing.

6. The apparatus of claim 1, wherein the coolant comprises ambient air.

7. The apparatus of claim 1, wherein the coolant comprises glycol.

8. The apparatus of claim 1, further comprising:
  a controller configured to transmit a control signal; and
  an actuator configured to move the plurality of fins in response to receiving the control signal.

9. The apparatus of claim 1, wherein the coolant flows in a path that is parallel relative to a longitudinal surface of each fin of the plurality of fins.

10. The apparatus of claim 1, wherein the coolant flows in a path that is perpendicular relative to a surface of each fin of the plurality of fins.

11. The apparatus of claim 1, wherein each of the plurality of fins extends perpendicularly relative to the interior surface of the skin.

12. An electric aircraft with thermal management, the electric aircraft comprising:
  an energy source configured to power the electric aircraft;
  a fuselage, wherein the fuselage comprises:
  a skin, the skin comprising:
    an interior surface;
    a plurality of fins, wherein each fin of the plurality of fins extends from the interior surface, and wherein each of the plurality of fins is angled so as to reduce a modification of an outer mold line of the electric aircraft, and wherein each fin of the plurality of fins is:
      directly attached to a fuselage of the electric aircraft;
      independently moveable; and
      individually removable;
    a plurality of channels, wherein each channel is at least partially defined by one or more of the plurality of fins;
    a cavity defined by the interior surface of the skin, wherein the cavity is configured to receive the energy source;
    wherein the plurality of channels facilitates flow of a coolant therethrough to reduce a thermal energy of the energy source by dissipating the thermal energy into the skin; and
    a divider comprising a fiber filter configured to prevent the debris traverse through a plurality of apertures, wherein the energy source sits atop of the divider.

13. The electric aircraft of claim 12, wherein the skin comprises a carbon fiber composite.

14. The electric aircraft of claim 12, wherein the skin comprises aluminum.

15. The electric aircraft of claim 12, further comprising coolant tubing, wherein the coolant tubing is received by each channel of the plurality of channels, allowing the coolant to traverse therethrough.

16. The electric aircraft of claim 15, further comprising a pump that is configured to actively move coolant through coolant tubing.

17. The electric aircraft of claim 12, wherein the coolant comprises ambient air.

18. The electric aircraft of claim 12, wherein the coolant comprises glycol.

19. The electric aircraft of claim 12, further comprising:
  a controller configured to transmit a control signal; and
  an actuator configured to move the plurality of fins in response to receiving the control signal.

* * * * *